United States Patent [19]

Knopp et al.

[11] 4,289,626

[45] Sep. 15, 1981

[54] WASTEWATER TREATMENT

[75] Inventors: Paul V. Knopp, Wausau; Walter Burant, Jr., Weston, both of Wis.

[73] Assignee: Sterling Drug, Inc., New York, N.Y.

[21] Appl. No.: 128,273

[22] Filed: Mar. 7, 1980

Related U.S. Application Data

[63] Continuation-in-part of Ser. No. 937,963, Aug. 30, 1978, abandoned, which is a continuation-in-part of Ser. No. 834,231, Sep. 19, 1977, abandoned.

[51] Int. Cl.³ ............................ C02F 1/28; C02F 3/08
[52] U.S. Cl. .................................. 210/616; 210/619; 210/669; 210/694
[58] Field of Search ...................... 210/11, 14, 17, 18, 210/27, 39, 40, 73 S, 150, 151, 616, 619, 631, 663, 694, 669

[56] References Cited

U.S. PATENT DOCUMENTS

| | | | |
|---|---|---|---|
| 3,557,954 | 1/1971 | Welch | 210/17 |
| 3,763,040 | 10/1973 | Timpe et al. | 210/27 |
| 3,904,518 | 9/1975 | Hutton et al. | 210/17 |
| 4,066,538 | 1/1978 | Cines et al. | 210/18 |
| 4,069,148 | 1/1978 | Hutton et al. | 210/18 |

FOREIGN PATENT DOCUMENTS 51-139169 12/1976 Japan.

Primary Examiner—Ivars C. Cintins
Attorney, Agent, or Firm—Charles R. Fay

[57] ABSTRACT

The invention relates to method and apparatus for the treatment of wastewaters using a rotating biological contactor in combination with an adsorbent.

6 Claims, 5 Drawing Figures

WASTEWATER TREATMENT

This application is a continuation-in-part of copending application Ser. No. 937,963, filed Aug. 30, 1978, which is in turn a continuation-in-part of application Ser. No. 834,231, filed Sept. 19, 1977, both now abandoned.

BACKGROUND OF THE INVENTION

1. Field of the Invention

This invention relates to a method for treating wastewaters with an adsorbent and a rotating biological contactor.

2. Description of the Prior Art

A variety of methods are available for the biological treatment of sewage and industrial wastewaters. Commonly used methods are the activated sludge process using air and pure oxygen and the trickling filter. More recently the rotating biological contactor, e.g. as described in Welch U.S. Pat. No. 3,557,954, Jan. 26, 1971, has found application in which a series of discs on a common shaft is rotated in the body of the wastewater alternately immersing a biological film formed on the disc in the liquid and exposing the film to the air above the liquid to provide oxygen for maintaining a biological film on the surface of the disc to effect biological oxidation of the wastewater. Reduced energy consumption for oxygen transfer is claimed in such a system which can be designed for a variety of applications ranging from ordinary carbonaceous $BOD_5$ removal to biological nitrification.

The broad concept of passing wastewater in countercurrent flow with continuously moving activated carbon to remove organic content of the water is disclosed by Timpe et al. U.S. Pat. No. 3,763,040, Oct. 2, 1973.

More recently, it has been suggested that powdered activated carbon be added to the activated sludge process to effect improvements in performance of the activated sludge system as taught in Hutton et al. U.S. Pat. No. 3,904,518, Sept. 9, 1975. Benefits claimed are improved stability, improved liquid solids separation, and a higher degree of treatment. The method taught in U.S. Pat. No. 3,904,518 is a single stage suspended slurry contact system in which the carbon is contacted only with the equilibrium concentration of adsorbable organics in the wastewater in the presence of activated sludge. For more efficient contact of the carbon with adsorbable material, it is desirable to effect a countercurrent contact with water to expose the carbon incrementally or continuously to a higher concentration of adsorbable material in the wastewater.

Prior Publication

Miyoshi et al. (Toyo Spinning Corp.) Japanese patent application, Publication No. 139169/76, published Dec. 1, 1976, discloses a method of biotreatment of wastewater comprising contacting the wastewater with activated carbon fixed on the surface of a fixed bed or disc. The publication date of the Japanese application is subsequent to the time the invention described and claimed herein was made.

SUMMARY OF THE INVENTION

The invention relates to a process for treating wastewater comprising the following steps:
 (a) contacting wastewater in a stream in a treatment zone with a multiplicity of surfaces alternately immersed in the stream and air above the stream, for a period of time of at least one-half hour while adding to the contactor an adsorbent capable of adsorbing impurities from the wastewater, and
 (b) removing the suspended solids from the contacting zone at a rate equivalent to the rate at which solids accumulate within the contactor.

The preferred adsorbent is powdered activated carbon, although the use of other adsorbents such as fuller's earth, fly ash and the like is contemplated. A preferred range of concentration of adsorbent is from 25 to 5000 milligrams per liter.

This invention results in a number of surprising beneficial results, each of which in itself is of major economic benefit to the application of the system. Furthermore, the results provide advantages not afforded by the use of activated carbon alone or a biological contactor alone.

As more stringent treatment requirements for wastewater are developed, it has become necessary to consume greater quantities of energy. For example, where oxidation of reduced nitrogenous material is desired, oxygen requirements are increased markedly requiring greater energy consumption. Further, the longer cell residence times result in greater conversion of cell mass to $CO_2$ and $H_2O$ requiring still greater oxygen transfer and energy consumption.

Further, the more stringent treatment requirements may make necessary the addition of tertiary treatment to remove residual organic materials as well as any toxic organic materials present in the wastewater. The use of granular or powdered activated carbon improves the removal of such organic materials.

It is therefore, the purpose of this invention to more effectively treat wastewaters by combining the desirable features of the rotating biological contact with the use of powdered activated carbon to achieve more efficient oxygen transfer, greater active biomass in the system, readily accomplish biological nitrification and denitrification and achieve a high overall degree of removal of organic constituents in the wastewater.

It is a still further objective of this invention to add the powdered activated carbon in such a manner as to provide countercurrent contact between the wastewater flow to improve the efficiency of the activated carbon in adsorbing organics.

It is a still further objective of the method to provide a means of adding virgin carbon to the system in a manner to provide effluent polishing in situations where the spent carbon is regenerated.

Other objectives and advantages will be illustrated in the detailed description of the process.

PREFERRED EMBODIMENT OF THE INVENTION

Figure 1:
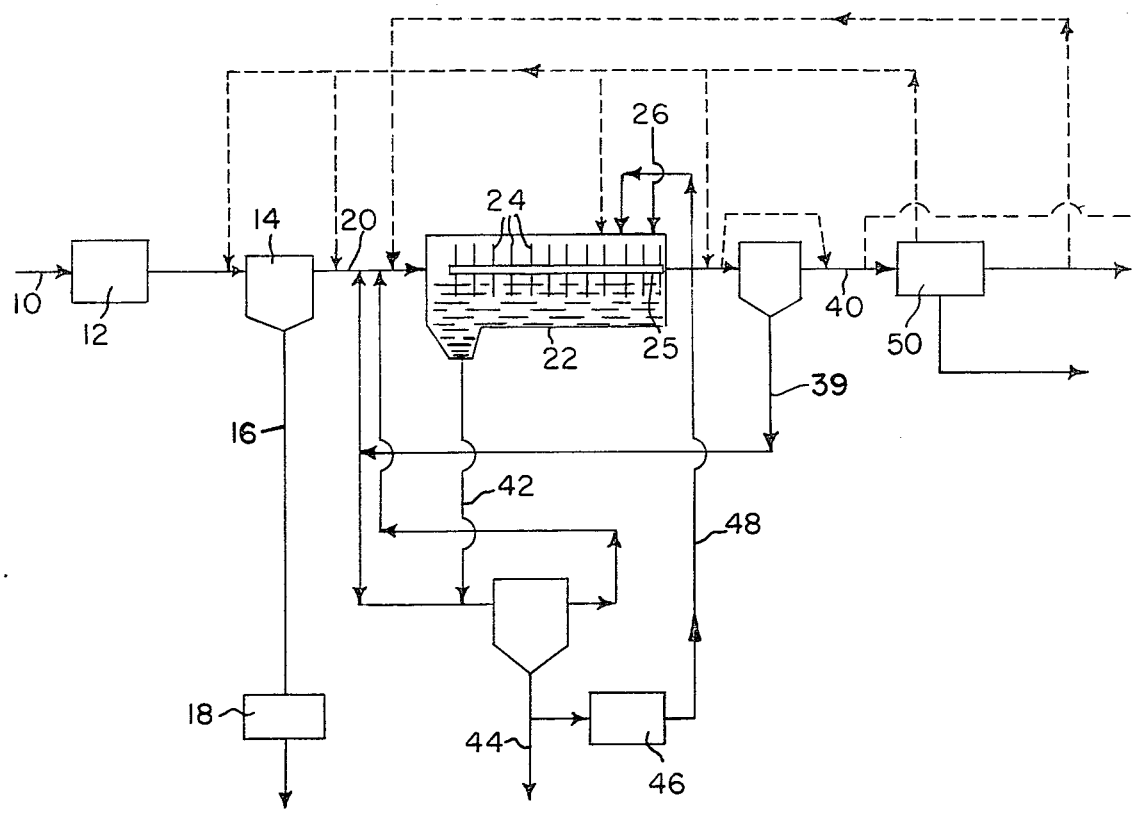
FIGS. 1 and 2 show the basic process.

Referring to FIG. 1, raw wastewater entering at 10 receives a preliminary treatment consisting of screening and grit removal in a device 12 for this purpose and passes to an optional primary treatment step consisting normally of plain sedimentation at 14 where suspended floating, and settling solids may be removed as by line 16 and disposed of by conventional means 18. The settled wastewater is passed then through a line 20 to a basin 22 in which a series of discs 24 are mounted on a common shaft 25 and rotated by convenient means to lie alternately in the liquid in the basin and in the gas space above the liquid. Normally flow through the basin is in a direction parallel to the shaft and perpendicular to the planes of the rotating discs. In some instances, flow is perpendicular to the shaft and parallel to the rotating discs.

Powdered activated carbon is added to the mixture in the basin as at 26, e.g., to provide adsorption of biodegradable and non-biodegradable material contained in the wastewater. The rate of carbon addition varies depending upon the treatment level required as well as the composition and characteristics of adsorbable material contained in the wastewater. Normally from 10 to 500 mg/l of treated wastewater are required, but for some industrial wastes, quantities as great as 5000 mg/l of wastewater treatment may be required.

The film formed on the surface of the disc consists of a mixture of biomass and adsorbent (activated carbon). Surprisingly, it has been observed that the film has the unusual property of accumulating the adsorbent into its structure, thereby carrying the adsorbent on the disc surface along with the biomass. The ratio of the mass of biological organisms to activated carbon will depend essentially upon the solids residence time of the system and the composition of the waste being fed to the system. It is apparent from the examples which follow that the adsorbent not only aids in removing adsorbable material from the wastewater, but also has the effect of substantially increasing the residence time of adsorbable and slowly biodegradable substances, and also has the effect of greatly increasing the overall solids residence time of the system.

This effect is beneficial when nitrification (biological oxidation of ammonia nitrogen) is desired since it permits the accumulation of slow growing nitrifying bacteria.

A further unexpected benefit derived from the addition of activated carbon to the contacting zone of the rotating biological contactor results from the carbon's tendency to reduce foaming. In many applications, the rotational speed of the contactor is limited by, among other things, the tendency for foaming to occur in the contactor. Foaming may occur due to the presence in the wastewater of surface active material or due to surface active exogenous organic materials produced by the organisms themselves. Since most, if not all of these materials are adsorbed onto the activated carbon, foaming is reduced or eliminated, permitting higher rotational velocities and concomitant oxygen transfer.

A still further surprising result of the addition of activated carbon to the rotating biological contactor is the effect of the carbon addition upon the overall mass transfer rate of oxygen. Measurements of the overall oxygen mass transfer rate ($K_La$) in the contactor is as much as twenty-five percent better than in the ordinary biological contactor. The improved mass transfer rate has a dual impact upon the performance of the contactor. First, a higher transfer rate permits slower rotational speeds and hence lower power costs; and second, the oxygen profile across the film on the disc is improved providing deeper penetration through the film with a greater resultant active aerobic biological mass. This effect is particularly important in nitrifying systems where the nitrifying organisms must be exposed to dissolved oxygen concentrations in excess of 0.5 mg/l to be effective.

Figure 3:
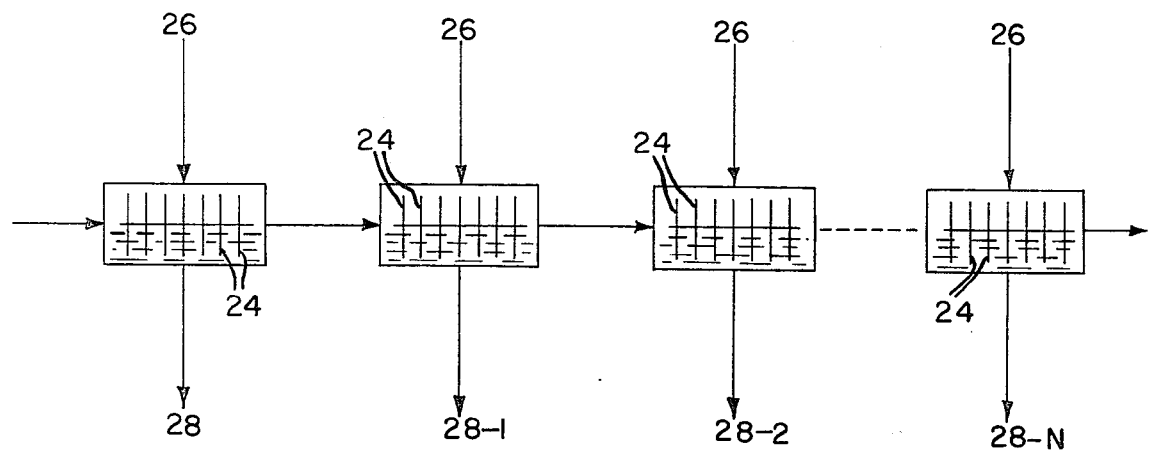
FIGS. 3, 4 and 5 illustrate detailed embodiments to effect countercurrent contact of the biomass and carbon slurry with the liquid phase.

While the carbon can be added at various points within the basin, advantages can be derived by adding the carbon at various points through the longitudinal dimension of the basin. For example, as shown in FIG. 3, if the carbon is added uniformly along the longitudinal length of the basin and the solids are removed as at 28, 28-1, 28-2 and 28-N along the longitudinal length, carbon contact consists of essentially a series of single stage contactors. The rate of addition at each point can be varied to control the loading on the carbon to match the treatment requirements of each successive stage.

Figure 4:
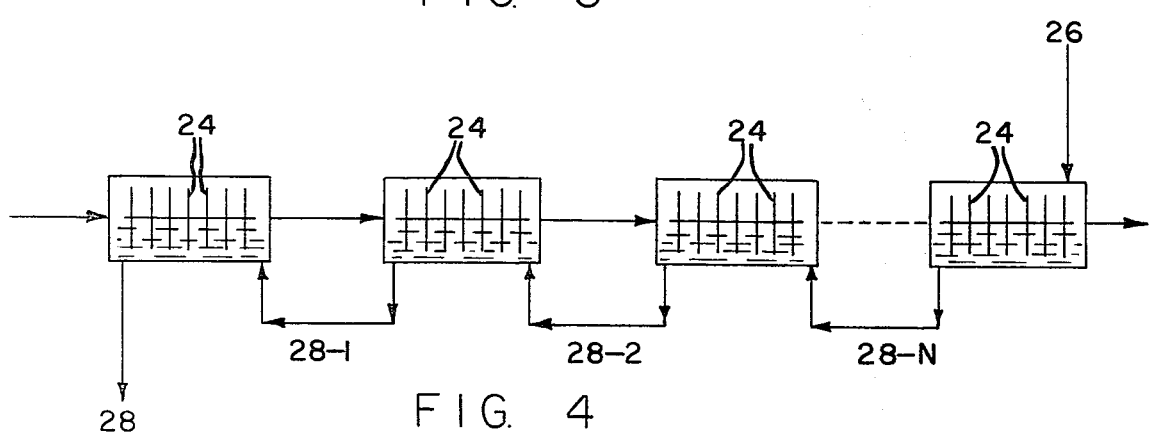

As is well-known, in adsorption systems, it is desirable to more efficiently load the adsorbent with adsorbate by moving the adsorbent in countercurrent relationship with the adsorbate. In suspended slurry systems, this is usually done by providing a separation step following each contacting stage. Solids separated at each stage are moved upstream, countercurrently to the liquid stream. FIG. 4 illustrates how this can be achieved in a rotating biological contactor by introducing the adsorbent (activated carbon) at the downstream end and providing a means of moving the carbon upstream, such that particles separating out at the bottom of the contactor tend to move in countercurrent manner along the bottom of the basin providing any number of equivalent countercurrent stages, thus providing maximum adsorption efficiency of the carbon. A variety of means can be utilized to effect countercurrent motion of the solids. For example, the discs can be mounted in a chamber with a sloping bottom such that the suspended particles tend to move in an upstream direction as they are disturbed at the bottom of the chamber.

For systems in which flow is introduced perpendicular to the shaft and parallel to the discs, a series of parallel shafts rotated such that the direction of rotation of the disc in the liquid is counter to the flow will produce countercurrent motion of the solids in the system.

Figure 5:
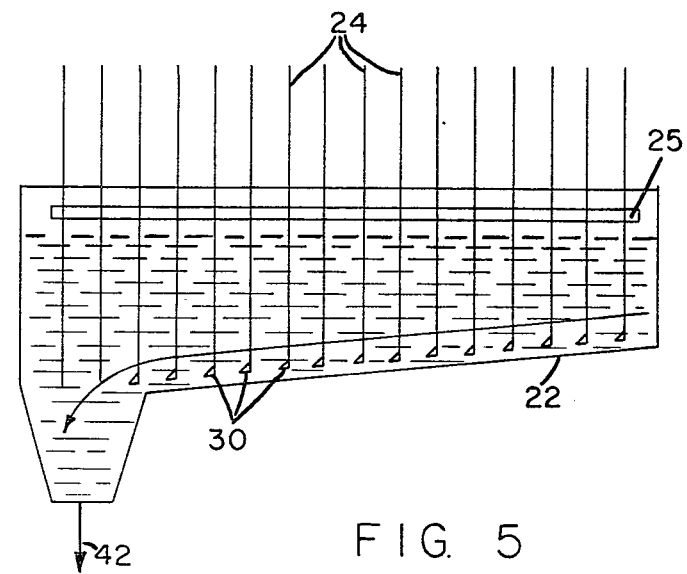

Alternatively, the periphery of each disc 24 can be fitted with plows or blades 30, directing the net solids flow in a countercurrent direction as illustrated in FIG. 5. An optimal relationship exists between the angle of attack of the plows, the effective rate of countercurrent movement, and power consumption to rotate the disc.

In another embodiment, the disc may be designed so that its periphery takes the shape of a screw with a small angle of slope such that when the disc rotates, the solids are pushed in an upstream direction. The downstream surface could remain flat or preferably takes the corresponding shape of the upstream face.

Other methods of achieving countercurrent flow may be apparent after study of the above examples. The fundamental principle involved in the above is that the adsorbent added is moved in a countercurrent relationship with the bulk of the liquid medium thereby effecting higher adsorptive loadings.

Figure 2:
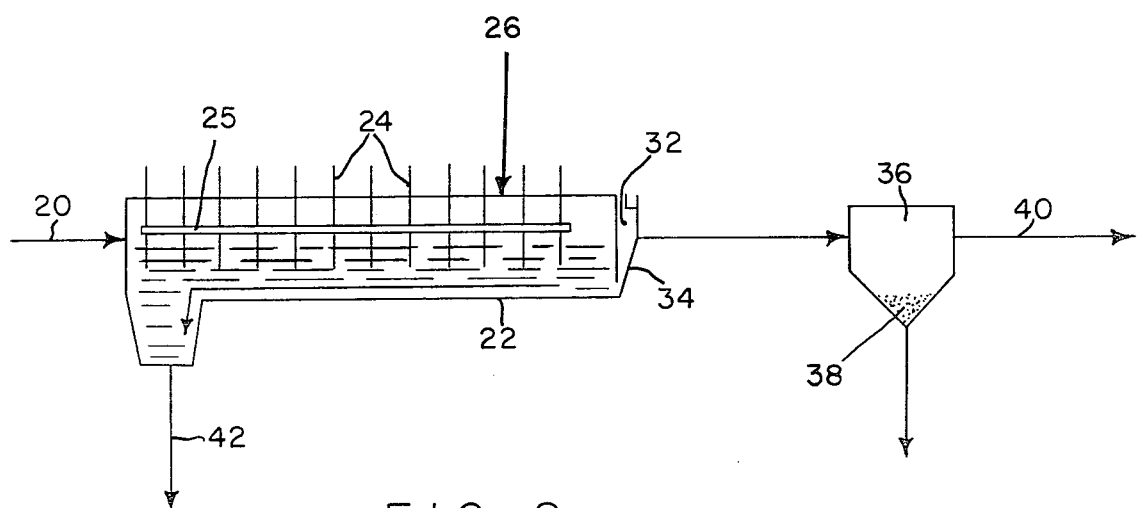

In practice, it is never possible to effect complete suspended solids separation within the chamber in which the discs are rotated because of turbulence created by the rotating disc. To effect improved separation, a quiescent chamber optionally is provided at the downstream end of the contactor as at 32, FIG. 2. The quiescent chamber has a steeply sloped bottom 34 to direct the solids upstream into the region where the disc can direct it further upstream. Alternatively, a conventional collector mechanism can be provided to positively convey the solids to the region of the disc for transfer countercurrently upstream.

Similarly, a secondary clarifier 36 can be provided to further clarify the liquid stream. Material settled in this clarifier as at 38 can be directed to the inlet end of the contacting chamber as by line 39, FIG. 1, or it may be mixed with the underflow from the contactor at 42 for further processing, for example, regeneration of the carbon adsorbent or to solids disposal.

Spent adsorbent at 42 along with the associated biomass can be optionally thickened and disposed of by conventional means 44, or it could be regenerated as at 46 and returned to the contactor for reintroduction into the treatment step at various points in the contactor, see line 48.

The treated wastewater 40 can be further processed through an optional sand filter 50 and disinfected and discharged to the receiving stream. Suspended solids captured in the sand filter can be backwashed and returned upstream to any of a number of upstream points in the system shown in FIG. 1. Other configurations are possible. For example, biological nitrification and denitrification can be achieved by operating a first stage under aerobic conditions to achieve oxidation of ammonia and a nitrogen removal stage in anaerobic conditions to achieve denitrification of nitrate and nitrite nitrogen to elemental nitrogen.

The following examples are intended to illustrate the process and are not intended to limit the scope of the invention in any way.

EXAMPLE I

The laboratory rotating biological contactor system consisted of fifty-two 10" diameter ¼" thick polyethylene discs suspended from a horizontal shaft and placed in a hemispherical-shaped 20 liter tank equipped with a cone settler near the outlet end. As the discs rotated, approximately 40 percent of the surface area thereof was immersed in liquid. Domestic sewage primary effluent was metered into one end of the tank. The mixed liquid overflowed from the opposite end into a clarifier equipped with a slow moving paddle. Two recycle lines were used to return thickened settlings from the clarifier and cone settler to the inlet end of the tank at rates of 40 ml/min. and 12 ml/min., respectively.

Initially, the system was operated on primary effluent for 19 days in order to build up layers of biomass on the discs. During the next 8 days, data on samples taken continuously were obtained on the system. On the 28th day of operation, 300 grams of activated carbon were added near the tank inlet. Daily, for the following 38 days, 1 liter of mixed liquor was withdrawn from the cone and 15.0 g dry activated carbon were added to the tank. The mixed liquor containing biomass and carbon was filtered. Dry filter cake weights ranging from 0.3 to 26.4 g were obtained. A feed rate of about 100 ml/min. was maintained throughout the experiment. Rotation speeds of 6 and 10 RPM were used to maintain the dissolved oxygen range of 0.5 to 5.0 and 0.6 to 6.0 mg/l in the systems without and with carbon. The average characteristics of the streams are listed in the following Table.

Note that the system operated with carbon showed better COD and $BOD_5$ reduction as well as nitrification than the system operated without carbon.

EXAMPLE I

|  | Without Carbon | | Carbon Added | |
| --- | --- | --- | --- | --- |
|  | Feed | Effluent | Feed | Effluent |
| COD, mg/l | 160 | 72 | 186 | 36 |
| % COD Reduction | — | 54 | — | 81 |
| BOD, mg/l | 64 | 16 | 34 | 2 |
| % BOD Reduction | — | 75 | — | 94 |
| Total Kjeldahl Nitrogen, mg/l | 43.3 | 31.9 | 50.5 | 14.4 |
| % Total Kjeldahl Nitrogen Reduction | — | 26 | — | 71 |
| Suspended Solids, mg/l | 32 | 24 | 38 | 9 |
| Suspended Ash, mg/l | 9 | 3 | 17 | 2 |
| Ammonia Nitrogen, mg/l | — | — | 39.8 | 10.5 |
| Nitrites as Nitrogen, mg/l | — | 1 | 0.1 | 1.5 |
| Nitrates as Nitrogen, mg/l | — | 1 | 1.5 | 27.8 |
| Total Phosphorus, mg/l | 9.4 | 8.7 | 12.5 | 11.5 |
| pH | 7.3 | 7.3 | 7.2 | 6.6 |

EXAMPLE II

The apparatus described in Example I was employed with a feed rate of about 200 ml/min. for 30 days. No comparative data of the system without carbon were obtained. The values for chemical oxygen demand, biochemical oxygen demand and Kjeldahl nitrogen reductions of this system without carbon at the faster feed rate would not exceed the figures for the 100 ml/min. rate listed in Example I. Daily filter cake dry weights varied from 4.08 to 26.14 g and averaged 11.50 g per day. The average data of the 200 ml/min. experiment are listed in the following Table.

EXAMPLE II

|  | Carbon Added | |
| --- | --- | --- |
|  | Feed | Effluent |
| COD, mg/l | 215 | 49 |
| % COD Reduction | — | 77 |
| $BOD_5$, mg/l | 60 | 7 |
| % BOD Reduction | — | 88 |
| Total Kjeldahl Nitrogen, mg/l | 48.9 | 12.7 |
| % Total Kjeldahl Nitrogen Reduction | — | 74 |
| Suspended Solids, mg/l | 45 | 7 |
| Suspended Ash, mg/l | 7 | 2 |
| Ammonia Nitrogen, mg/l | 40.2 | 5.2 |
| Nitrites as Nitrogen, mg/l | 0.1 | 1.1 |
| Nitrates as Nitrogen, mg/l | 1 | 23.2 |
| Total Phosphorus, mg/l | 14.6 | 13.1 |
| pH | 6.9 | 6.9 |

Note that in spite of the doubling of the loading rate to the system, comparable $BOD_5$ and COD reductions and nitrification of the ammonia nitrogen were obtained when compared to the results of Example I.

EXAMPLE III

The apparatus described in Example I was modified to achieve a countercurrent flow of activated carbon and primary sewage effluent. The cone settler was moved to the inlet of the trough. Clarifier and cone recycle slurries plus the virgin carbon were introduced near the trough outlet. Spent carbon slurry was withdrawn daily from the cone settler. Average feed rates of 111 ml primary sewage effluent per minute and 94 mg activated carbon per liter of effluent were used. An average of 16.1 g dry solids were removed daily. The average analytical data are presented in the following Table.

EXAMPLE III

|  | Feed | Effluent |
|---|---|---|
| COD, mg/l | 227 | 43 |
| % COD Reduction | — | 81 |
| $BOD_5$, mg/l | 60 | 7 |
| % BOD Reduction | — | 88 |
| Total Kjeldahl Nitrogen | 48.9 | 12.7 |
| % Total Kjeldahl Reduction | — | 74 |
| Suspended Solids, mg/l | 28 | 6 |
| Suspended Ash, mg/l | 2 | 1 |
| Ammonia Nitrogen, mg/l | 47.4 | 11.8 |
| Nitrites as Nitrogen, mg/l | 0.1 | 0.5 |
| Nitrates as Nitrogen, mg/l | 1.5 | 17.0 |
| Total Phosphorus, mg/l | 16.0 | 14.7 |
| pH | 6.5 | 6.3 |

EXAMPLE IV

To illustrate the effect of the addition of activated carbon to the contactor upon the overall mass transfer rate of oxygen, tests were conducted in accordance with the methods described by Eckenfelder and Ford* to determine Alpha, the ratio of the mass transfer rate of oxygen in the carbon-biomass slurry and biomass alone. Tabulated below are the Alpha values obtained:

$$\text{Alpha } (\alpha) = \frac{K_L a \text{ Wastewater}}{K_L a \text{ Tap Water}}$$

| Wastewater | Biological System | Biological Plus Activated Carbon |
|---|---|---|
| Pharmaceutical Waste | — | 2.43 |
| Domestic Waste | 0.82 | 1.27 |
| Municipal/Industrial Waste | 0.81 | 1.05 |

*"Experimental Procedures for Process Design" *Water Pollution Control*, Pemberton Press, Jenkins Publishing Co., Austin, Tex. (1970), pp. 103–112

The carbon addition has the effect of greatly increasing the overall oxygen mass transfer rate ($K_L a$) when compared to the biological system and permits equivalent oxygen transfer at greatly reduced peripheral speeds.

We claim:
1. A process for treating wastewater comprising the following steps:
   a. contacting wastewater in a stream in a biological contactor apparatus which has a multiplicity of surfaces therein alternately immersed in the stream and air above the stream, for a period of time of at least ½ hour while adding co-currently to the stream in the biological contactor apparatus an adsorbent capable of adsorbing impurities from the wastewater; and
   b. removing accumulated suspended solids from the contactor apparatus at a rate substantially equivalent to the rate at which solids accumulate within the contactor.
2. A process according to claim 1 in which the adsorbent is powdered activated carbon.
3. A process according to claim 1 in which the amounts of adsorbent added ranges from 25 to 5000 mg/l.
4. A process according to claim 1 including the step of removing solids from the wastewater prior to the contacting step.
5. A process according to claim 1 in which the contacting surfaces comprise a series of discs mounted on a common shaft which is rotated to alternately immerse the disc and its associated biological film in the stream and in gas above the liquid.
6. A process for treating wastewater comprising the following steps:
   a. contacting wastewater in a stream in a biological contactor apparatus which has a multiplicity of surfaces therein alternately immersed in the stream and air above the stream, for a period of time of at least ½ hour while adding to the stream an adsorbent capable of adsorbing impurities from the wastewater, and
   b. removing accumulated suspended solids from the contactor apparatus at a rate substantially equivalent to the rate at which solids accumulate within the contactor,
   wherein the adsorbent is added at the downstream end of the biological contactor apparatus and is moved by the surfaces in the contactor apparatus in countercurrent relationship with the bulk of the liquid flow.

* * * * *